P. E. YOUNG.
GRAVITOMETER.
APPLICATION FILED MAR. 10, 1915.

1,257,662.

Patented Feb. 26, 1918.
2 SHEETS—SHEET 1.

WITNESSES
Geo. Schwarz
W. S. Orton

INVENTOR
Philip E. Young
BY
Messimer and Austin
ATTORNEYS

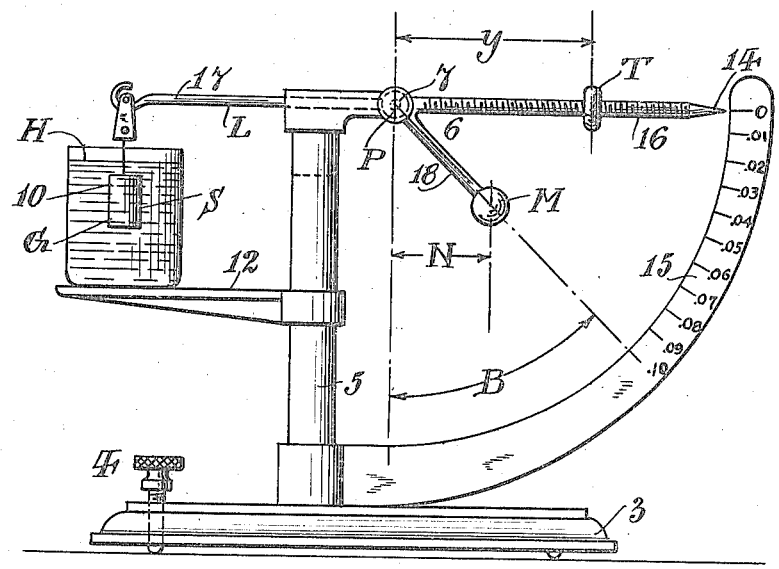
Fig. 3.
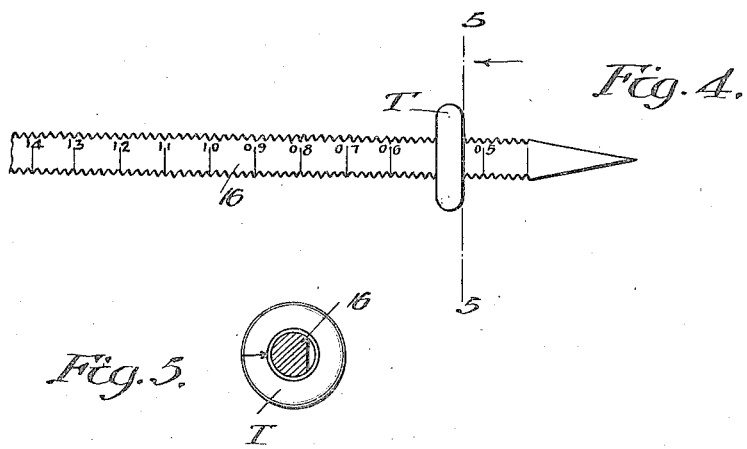
Fig. 4.
Fig. 5.

UNITED STATES PATENT OFFICE.

PHILIP E. YOUNG, OF FAIRHAVEN, MASSACHUSETTS.

GRAVITOMETER.

1,257,662. Specification of Letters Patent. Patented Feb. 26, 1918.

Application filed March 10, 1915. Serial No. 13,491.

*To all whom it may concern:*

Be it known that I, PHILIP E. YOUNG, a citizen of the United States, and resident of Fairhaven, in the county of Bristol and State of Massachusetts, have invented certain new and useful Improvements in Gravitometers, of which the following is a specification.

My invention relates to improvements in instruments for determining the specific gravity of liquids by the sinker method, and this application constitutes a continuation of the subject-matter disclosed in my co-pending application for specific density balances, Serial No. 874,997, filed December 1, 1914.

Among the objects of my invention is to provide a simple form of instrument for indicating quickly and directly on a suitably graduated scale the specific gravity of liquids accurately, without the necessity of correcting for errors, without complicated manipulation and without resort to mathematical computations.

Another of the objects of my invention is to provide such an instrument designed to be used with any desired liquid as a standard and with any type or weight of sinker best adapted to determine the specific gravities desired.

A further object of the invention is to provide a device of the above indicated character which will give readings of any desired degree of accuracy over a relatively long range of specific gravities.

Various other objects and advantages of the invention will be in part obvious from an inspection of the accompanying drawings and in part will be more fully set forth in the following particular description of two forms of mechanism embodying the invention, and the invention also consists in certain new and novel features of construction and combinations of parts hereinafter set forth and claimed.

Referring to the accompanying drawings:

Figs. 2 and 3 are similar views showing modified forms of weight beams and scales.

Fig. 4 is an enlarged detailed view of a portion of the weight arm; and

Fig. 5 is a transverse sectional view taken on the line 5—5 of Fig. 4.

Figure 1:
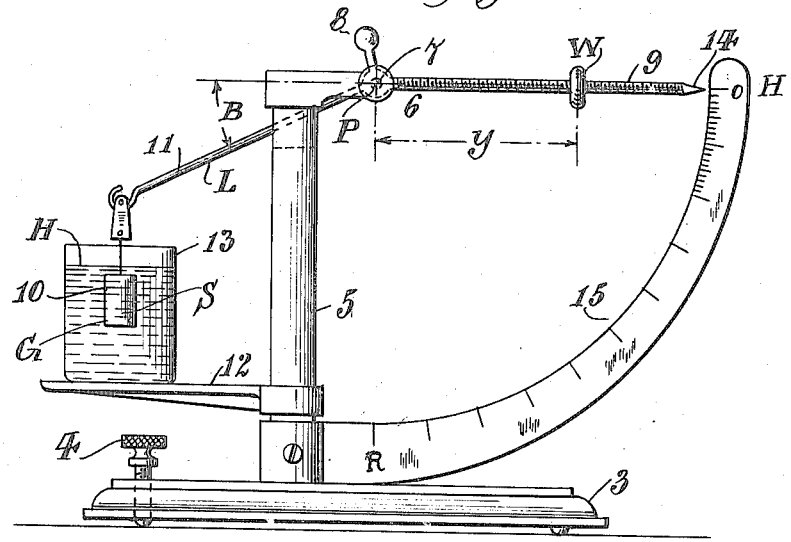
Figure 1 is a side elevation of an instrument disclosing a preferred embodiment of my invention.

The instruments illustrated are sensitive co-tangent balances and the description of one will be sufficient to include the common features of all forms. The instrument includes a base frame 3 provided with a leveling screw 4 and a standard 5 extending vertically from the base 3. A balance beam 6 is pivotally mounted on the standard 5 and is free to oscillate in a vertical plane. The beam is mounted on a horizontally disposed pivot pin 7 providing the fulcrum P at its center of gravity, which centering of the beam at the fulcrum is provided by means of the head 8.

Referring particularly to the form illustrated in Fig. 1, the beam comprises a pair of balanced arms projecting on opposite sides of the fulcrum and extending at any obtuse angle to each other with the supplement thereof having a valve B. One of the arms 9 hereinafter designated as the weight arm is arranged to be horizontally disposed when the turning moments about the fulcrum P are balanced and a counterbalancing weight W is movable thereon to and from the fulcrum. This weight arm is preferably in the form of a rod threaded micrometrically so as to provide for a refined adjustment of the weight and to hold the same in set position relative to the fulcrum. This weight is caused to counterbalance the sinker 10 suspended from the other arm 11 of the beam. The sinker 10 has a weight S and a specific density G and is suspended on the arm 11, L-units of length from the fulcrum P. The standard 5 is provided with an adjustable platform 12 adapted to be adjusted vertically thereon and adapted to be swung into position beneath the sinker. A receptacle 13 adapted to contain, first, a liquid of specific gravity H and afterward the liquid to be tested, rests on the platform in position to have the sinker 10 submerged therein.

A pointer 14 extends radially from the fulcrum, is attached to the beam to indicate the angular movement thereof and is made relatively long so as to magnify this movement. The extreme end of the pointer is arranged to move over a curved scale 15 under the influence of the buoyant effect of the displaced liquid when the sinker is submerged within the liquid in the receptacle 13. The scale is in the form of a quadrant disposed on the side of the standard having the weight arm with its lower portion affixed to the standard and base and arranged so as to extend in the plane of movement of the pointer and in a curve described about the fulcrum as a center. The scale is provided with a balance mark O positioned thereon in a horizontal plane containing the axis of oscillation of the balance arm and opposite the position assumed by the pointer when the weight W, spaced $y$-units distance from the fulcrum, counterbalances the sinker when submerged in liquid of specific gravity H, which is preferably selected to equal the means of the range of specific gravities to be taken.

The scale is graduated to indicate specific gravities from the mark O downward toward the bottom of the scale in gradually increasing numerical values from the value of the system at O, which indicates the specific gravity of the standard liquid H.

In operation, the sinker is submerged in the liquid H and the weight W adjusted until the pointer registers at O. The sinker is then submerged in the liquid $g$ to be tested and the pointer moves downward under the buoyant effect of the liquid on the sinker until it reaches a position opposite the numeral on the scale which indicates the specific gravity of the liquid $g$.

This is due to the fact that the numerals on the scale are so spaced that this angle of motion $\alpha$ of the pointer from the mark O is the angle whose tangent equal $$\left(\frac{g-H}{G-g}\right) \cos B.$$

It will be understood that when the sinker 10 is immersed in liquid of gravity H it loses in weight an amount equal to the weight of an equal volume of the liquid H. Now G equals the weight of the sinker in air, divided by the loss of weight in water equals $$\frac{S}{S-\text{weight of water}}$$

When the sinker is immersed in the liquid of gravity H, the loss of weight is equal to H times the loss of weight in water. Therefore, weight of sinker in liquid of gravity H, equals S—loss of weight of sinker in liquid H=
$$S-(S-\text{weight of S in water})H$$
and $$(S-\text{weight of S in water})=\frac{S}{G}$$

therefore weight of sinker in liquid H=

$$S-\frac{HS}{G}=\frac{S}{G}(G-H)$$

By moving weight W until the system balances at O with S immersed in liquid H, and taking moments about point P, $$\frac{S}{G}(G-H)L \cos B = Wy$$

now when sinker is immersed in liquid other than H, such as $g$, weight of sinker in liquid $g$ equals $$\frac{S}{G}(G-g),$$

by the same reasoning as used in arriving at the weight in liquid H.

Now the equilibrium will be disturbed as this weight is different from that in H, and the beam will swing through the angle $(\alpha)$ until a new position of equilibrium is assumed by the system.

Considering that when $\alpha$ becomes greater than B, we disregard the minus sign as it signifies only that point D is above the center line, and taking moments about the point P, $$\frac{S}{G}(G-g)L \cos (B-\alpha) = Wy \cos \alpha$$

and from the value $Wy$ determined above (when immersed in liquid H)

$$\frac{S}{G}(G-g)L \cos (B-\alpha) = \frac{S}{G}(G-H)L (\cos B \cos \alpha)$$

or dividing both sides by $\frac{SL}{G}$ $$(G-g) \cos (B-\alpha) = (G-H) (\cos B \cos \alpha)$$

and $$\cos (B-\alpha) = \cos B \cos \alpha + \sin B \sin \alpha$$

therefore $$\frac{G-H}{G-g} = \frac{\cos B \cos \alpha + \sin B \sin \alpha}{\cos B \cos \alpha} = 1 + \tan B \tan \alpha$$

from this $$\tan \alpha = \frac{\frac{G-H}{G-g}-1}{\tan B} = \left(\frac{g-H}{G-g}\right) \cot B$$

or the angle of motion of the pointer away from point O is the angle whose tangent equals $$\left(\frac{g-H}{G-g}\right) (\cot B),$$

and the arc graduated to read between H and G according to above value.

Figure 2:
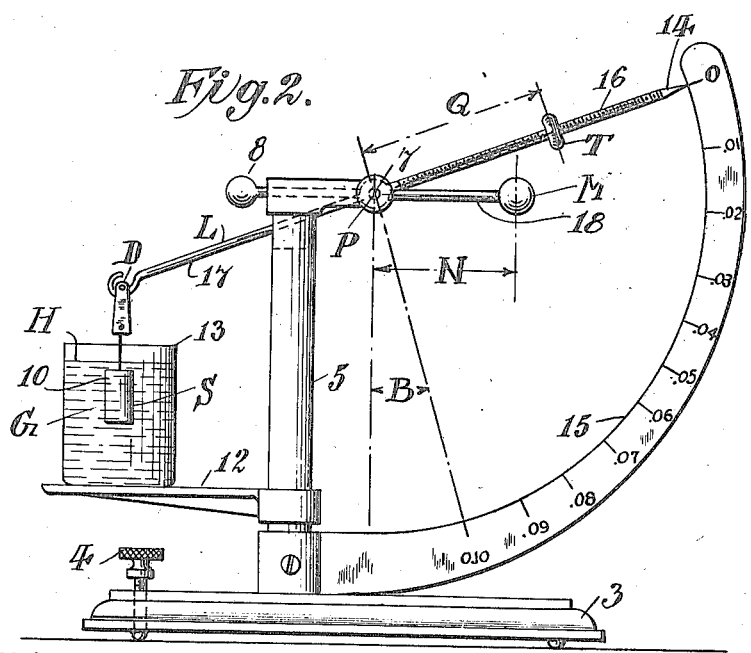

Referring to the form shown in Fig. 2 the beam is in the form of a horizontally disposed X with the axis of the weight arm 16 and the sinker arm 17 in the same line and passing through the axis of oscillation P of the beam, which point P is the center of gravity of the beam without the sinker or the weights hereinafter described. The arm 17 has the sinker S suspended therefrom at the point D, which is L units of length from the fulcrum. The arm 16 resembles the arm 9 in construction and carries a shiftable weight T. One of the other arms 18 extends from the fulcrum at an angle B from the arm 16, is normally positioned horizontally, has a weight M fixed thereon. This arm 18 is preferably short and the factor M times N is a constant for use with sinkers of same weights and gravities.

Consider the weight S suspended in air at the point D, and the weight T moved to a distance of Q units of length from the point P, these being the only weights on the beam.

Taking moments about P

SL cos B—TQ cos B represents the moment about the point P due to these two weights; dividing this moment by L cos B will give the composition of forces at the point D and this equals.

$$S - \left(\frac{T}{L}\right)(Q) \quad (1)$$

the weights S and T being constant they bear a given relation to each other, and we will consider $\frac{T}{S} = A =$ this relation or ratio, therefore $$T = AS$$

substituting in (1), the effective weight at D, due to sinker and weight T,=

$$\left[S - \left(\frac{AS}{L}\right)Q\right] = \frac{S}{L}(L - AQ),$$

and the effective gravity of the system=

$$\frac{\left(\frac{S}{L}(L-AQ)\right)G}{S} = \frac{G}{L}(L-AQ) = G - \left(\frac{GA}{L}\right)Q = E$$

therefore by moving weight on the arm 16 we can get any desired effective gravity and the arm 16 may be calibrated to read in the effective gravity when G and A remain constant quantities. For example

G = 2.00
A = .5
L = 4″

$$\text{Effective gravity} = 2.00 - \frac{2. \times .5}{4}Q$$

$$= 2.00 - \frac{Q}{4}$$

or from the formula $$\text{Effective gravity} = E = G - \left(\frac{GA}{L}\right)Q$$

$$Q = (G-E)\frac{L}{GA} = \frac{L}{A} - \left(\frac{L}{GA}\right)E$$

and from this formula Q may be calculated and plotted directly on the arm 16.

This value E may be substituted in the formula $$\tan \alpha = \left(\frac{g-H}{G-g}\right)\cot B,$$

for the gravity G, considering arm 18 as weightless. In practice, weight M would equal weight of (18)+the ball and N would be distance from pivot to center of gravity of 18 plus the ball, horizontally.

Now consider the weight M at a distance N from P on the arm 18, this being the moment necessary to make the system balance, so that the index is at zero when the sinker S is immersed in liquid H and let it be desired to have the total range of reading above H equal to $r$ or in other words equals the difference in gravity between E and H or $$r = E - H$$

or $$E = H + r$$

the effective weight at D when S is suspended in air=

$$\left(\frac{E}{G}\right)(S) = \left(\frac{H+r}{G}\right)(S)$$

and loss of weight due to immersion in liquid H=

$$\left(\frac{H}{G}\right)(S)$$

therefore weight of sinker in liquid H equals $$\left(\frac{H+r}{G}\right)(S) - \frac{H}{G}(S) = \frac{rS}{G}$$

therefore $$\frac{rS}{G}L \cos B = MN$$

and as this is independent of H, M and N are constant quantities for a given sinker, for all sinkers where $\frac{S}{G}$ is constant, or in other words all sinkers of equal volumes, over the whole range of gravities and the index will register how many points the gravity of the liquid to be tested is from the gravity H, or from the gravity E.

The operation of this balance is extremely simple, it merely being necessary to immerse the sinker in the liquid to be tested and move the weight T to a position on the arm 16 so that the pointer will fall between O and R. The weight T of course, should register at a given line in the graduation of arm 16. The pointer will then register how much greater than H, or less than G is the gravity of the liquid.

It is evident that B could be any angle up to 90 deg., and that the starting point for the index could be other than that shown in which case the mathematics would change, but the principle would be the same.

Referring to the modification of Fig. 3 the arms 16 and 17 are normally disposed in horizontal positions with the pointer 19 formed on the end of the arm 16. The arm 18 depends from the fulcrum below the arm 16 and forming an acute angle B therewith. The sinker with a weight S is suspended L units of length from the fulcrum in a known liquid and the weight T adjusted to counterbalance the sinker in which case the weight is $y$ units of length from the fulcrum. As in the previous form, the weight M is N units of length from the vertical through the fulcrum and the moment MN is constant for sinkers of equal volumes used in the system.

In the form illustrated in Fig. 3 the zero position of the pointer is horizontally disposed relative to the fulcrum in which case the mathematics is as follows:

Immersed in liquid of gravity H $$SL - S\frac{H}{G}L = Ty + MN = SL\left(1 - \frac{H}{G}\right)$$

and arm 16 graduated directly in H.

Immersed in liquid of gravity $g$ $$SL\left(1 - \frac{g}{G}\right)\cos \alpha = Ty \cos \alpha + \left(\frac{MN}{\cos B}\right)\cos (\alpha + B)$$

solving for tan $\alpha$ from this equation $$\tan \alpha = \frac{SL(g-H)}{G(\tan B)MN}$$

from which it can be seen that the tangent of the angle is equal to a constant times the difference in gravity between the gravities $g$ and H.

An example will make this clear: Consider a balance having the following dimensions:

G = 2.488
T = 10.260
S = 14.180
$A = \frac{T}{S} = .7234$
L = 5
B = 45°
$MN = \frac{5}{18}T$ Thread per inch on arm OH = 18.
Movement of T to equal 0.10 change in gravity reading $= \frac{5}{18}$.

from which it will be seen that the arm 16 is graduated in terms of effective gravity minus 10, as the factor MN balances ten points. In other words instead of gravity "one" being at a distance of 4.13 inches from the fulcrum it is $$4.13'' - \frac{5''}{18}$$

and all the other graduations are made accordingly.

It is obvious that the weight T may have radical graduations and the arm 16 may be provided with lineal graduations so that a direct reading of the gravity of the liquid may be made by moving weight T until the pointer balances at O, but this would be a delicate adjustment to make, and it would be easier to operate as heretofore described.

By means of a device of this character, the specific gravity of any desired liquid may be accurately and quickly obtained by reference to a liquid of known specific gravity without the necessity of any other operation than submerging a suitable sinker in the two liquids and reading the position of the pointer on the scale.

Another obvious use to which the device may be placed is to indicate shrinkage of cotton or similar products or in general to indicate loss of weight in terms of percentages in any operation where it is desired to determine percentage loss of weight.

In an operation of this character, the material to be tested is substituted for the sinker of Fig. 1, and the beam balanced at O by the adjustment of the weight W. The material is then allowed to dry and the pointer will swing through an angle $\alpha$ which will designate the percentage of shrinkage ($m$) according to the formula $$\cot \alpha = \left(\frac{100}{m} - 1\right)\tan B.$$

Having thus described my invention, I claim:

1. An instrument for determining the specific gravities of liquids by the sinker method comprising a co-tangent balance having a beam fulcrumed at its center of gravity and adapted to have a sinker suspended from one arm thereof, a weight movable on the other arm thereof toward and from the fulcrum, a scale for indicating the angular movements of said beam under the buoyant effect of the sinker when submerged in a liquid, said scale being graduated in terms indicating the specific gravity of the liquid in which the sinker is submerged.

2. An instrument for determining the specific gravity of liquids by the sinker method, comprising a co-tangent balance having a beam fulcrumed at its center of gravity and adapted to have a sinker suspended from one arm thereof, a weight movable on the other arm toward and from the fulcrum, a pointer controlled by the movement of said beam when subjected to the buoyant effect of liquid in which the sinker is submerged, a scale for said pointer indicating the angular movement of the beam, said scale having a balance mark thereon opposite the positions assumed by the pointer when the sinker is counterbalanced in a liquid of standard specific gravity and said scale being graduated in progressively increasing numerical values from said balance mark in the direction of movement of the pointer when the sinker is submerged in liquids of increasing specific gravities, said numerical values indicating the increase in specific gravity over the standard specific gravity of the different liquids in which the sinker is submerged.

3. A co-tangent balance for use in determining specific gravities of liquids by the sinker method comprising a beam with one of its balancing arms forming an angle B with the continuation of the other arm and adapted to have a sinker with a specific density G suspended therefrom for submersion in a liquid and a counterbalancing weight carried by the other arm, a pointer controlled by the movement of said beam when subjected to the buoyant effect of the displaced liquid on the sinker, a scale for said pointer, said scale having a balance mark therein opposite the position assumed by the pointer when the sinker is in a liquid of known specific gravity H, said scale being graduated in progressively increasing numerical values from the balance mark, each particular value indicating increase of specific gravity over the standard specific gravity H and arranged so that the angle of motion of the pointer away from the balance mark is the angle whose tangent equals $$\frac{g-h}{G-g} \cot B$$

where $g$ is the specific gravity of the liquid to be tested.

4. A device of the class described, including a balance beam comprising an arm adapted to have a sinker suspended therefrom, which sinker is adapted to be submerged in different liquids, a weight arm having a counterbalancing weight mounted thereon adjustable to and from the fulcrum of the balance, a second weight arm disposed on the side of the fulcrum having the first named weight arm and extending at an obtuse angle thereto, a weight mounted on said second named weight arm, a pointer for indicating the angular movement of said balance under the buoyant effect of the displaced liquids on the sinker, a scale for said pointer, said scale being graduated in terms to indicate the specific gravity of the liquids in which the sinker is submerged.

5. A device of the class described, including a balance beam comprising an arm adapted to have a sinker suspended therefrom, which sinker is adapted to be submerged in different liquids, and a weight arm having a counterbalancing weight mounted thereon adjustable to and from the fulcrum, an additional weight acting on the side of the balance having the weight arm tending to counteract the weight moments of the sinker on the other arm, a pointer for indicating the angular movement of said balance under the buoyant effect of the displaced liquids on the sinker, a scale for said pointer, said scale being graduated in terms to indicate the specific gravity of the liquids in which the sinker is submerged.

6. A device of the class described, including a balance beam comprising an arm adapted to have a sinker suspended therefrom, which sinker is adapted to be submerged in different liquids and a weight arm having a counter-balancing weight mounted thereon and adjustable to and from the fulcrum of the balance, said weight arm being graduated to indicate specific densities of the liquids in which the sinker is submerged, said weight constituting a pointer for said graduations and a scale having a balancing mark thereon for indicating the position of the beam when the turning moments about the fulcrum are balanced.

7. A device of the class described, including a balance beam comprising an arm adapted to have a sinker suspended therefrom, which sinker is adapted to be submerged in different liquids and a weight arm having a counterbalancing weight mounted thereon and adjustable to and from the fulcrum of the balance, said weight arm being graduated to indicate specific densities of the liquids in which the sinker is submerged, said weight constituting a pointer for said graduations and a scale having a balancing mark thereon for indicating the position of the beam when the turning moments about the fulcrum are balanced, said scale being graduated in progressively increasing numerical values from the balancing mark in the direction of movement of the scale under the buoyant effect of the liquid on the sinker to indicate fractional parts between succeeding values on the weight arm.

8. A device of the class described, comprising a balance beam, comprising an arm adapted to have a sinker suspended therefrom, and a weight arm having a weight adjustable thereon to and from the fulcrum of the balance, said arm being graduated to indicate specific gravities with said weight constituting a pointer therefor, a pointer for indicating the angular movement of said beam and a scale for said pointer, said scale being graduated to indicate fractional parts of the numerical values on the graduated arm.

9. A device of the class described comprising a balance beam, comprising an arm adapted to have a sinker suspended therefrom, and a weight arm having a weight adjustable thereon to and from the fulcrum of the balance, said arm being graduated to indicate specific gravities with said weight constituting a pointer therefor, a pointer for indicating the angular movement of said beam, a scale for said pointer, said scale being graduated in values indicating increase of specific gravities over a standard gravity and arranged so that the angle of motion of the pointer away from the value indicating the standard gravity is the angle whose tangent is equal to a constant times the difference in gravity between the standard specific gravity and the gravity of the liquid whose specific gravity is desired.

10. An instrument for determining the specific gravities of liquids by the sinker method comprising a co-tangent balance having a beam fulcrumed at its center of gravity and adapted to have a sinker suspended from one arm thereof, a weight movable in the other arm thereof toward and from the fulcrum, said arms being at an obtuse depending angle to each other, a scale for indicating the angular movements of said beam under the buoyant effect of the sinker when submerged in a liquid, said scale being graduated in terms indicating the specific gravity of the liquid in which the sinker is submerged, and the graduations on said scale being arranged so that the angle of movement of the pointer in passing from its position with the sinker in one liquid of specific gravity H to its position when the sinker is in another liquid of specific gravity $g$ is the angle whose tangent is $\dfrac{g-H}{G-g}$ times the co-tangent of the supplement of the depending angle between the arms of the balance.

11. A co-tangent balance for use in determining loss of weight of materials, comprising a beam with one of its balancing arms forming an angle B with the continuation of the other arm, and adapted to have the materials to be weighed suspended therefrom, a counterbalancing weight carried by the other arm and adapted to be moved into position to counterbalance the initial weight of the materials, a pointer controlled by the movement of said beam when subjected to the loss of weight of the materials, a scale for said pointer, said scale being graduated so that each particular value ($m$) will be in terms of loss of weight by percentage and arranged so that the angle of motion of the pointer away from its initially balanced position will be the angle whose tangent equals $$\left(\frac{100}{m}-1\right)\tan B.$$

Signed at New Bedford, in the county of Bristol and State of Mass., this 8th day of March, A. D. 1915.

PHILIP E. YOUNG.

Witnesses:
CHAS. N. RICHMOND,
CLINTON P. WARDELL.